United States Patent
Parfut et al.

(10) Patent No.: US 8,251,424 B2
(45) Date of Patent: Aug. 28, 2012

(54) STRUCTURAL ARRANGEMENT OF A MOTOR VEHICLE

(75) Inventors: Sylvain Parfut, Rueil Malmaison (FR); Pierre Cailleaux, Corbreuse (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/921,290

(22) PCT Filed: Mar. 5, 2009

(86) PCT No.: PCT/FR2009/050362
§ 371 (c)(1),
(2), (4) Date: Sep. 7, 2010

(87) PCT Pub. No.: WO2009/115739
PCT Pub. Date: Sep. 24, 2009

(65) Prior Publication Data
US 2011/0089718 A1 Apr. 21, 2011

(30) Foreign Application Priority Data
Mar. 5, 2008 (FR) ...................... 08 51441

(51) Int. Cl.
*B62D 33/06* (2006.01)
*B62D 25/20* (2006.01)

(52) U.S. Cl. ............... 296/24.43; 296/183.1; 296/184.1; 296/204; 296/190.08

(58) Field of Classification Search ............. 296/203.01, 296/203.04, 193.08, 190.08, 190.01, 183.1, 296/26.08, 184.1, 204, 193.07, 203.02, 37.16, 296/24.43
See application file for complete search history.

(56) References Cited

U.S. PATENT DOCUMENTS

| | | | | |
|---|---|---|---|---|
| 3,661,419 A | * | 5/1972 | Mitamura et al. | 296/203.04 |
| 4,449,748 A | * | 5/1984 | Fiala et al. | 296/183.1 |
| 4,836,600 A | | 6/1989 | Miyazaki et al. | |
| 6,398,291 B1 | * | 6/2002 | Reusswig et al. | 296/186.4 |
| 6,478,355 B1 | | 11/2002 | Van Eden et al. | |
| 2010/0059953 A1 | * | 3/2010 | Ben-Ari et al. | 280/80.1 |

FOREIGN PATENT DOCUMENTS

| | | |
|---|---|---|
| DE | 38 13 455 | 11/1988 |
| DE | 103 45 318 | 4/2005 |
| JP | 2006 076467 | 3/2006 |

OTHER PUBLICATIONS

International Search Report issued Sep. 28, 2009 in PCT/FR09/050362 filed Mar. 5, 2009.

\* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A structural arrangement of a motor vehicle, of a type including a cabin and a loading bed, between which a substantially vertical partition extends, of a type including a cabin floor that extends at a first height, and a loading floor of the bed that extends at a second height that differs from the first height of the cabin floor, and of a type including a hollow body that stiffens the structure and extends substantially vertically between the first height of the cabin floor and the second height of the loading floor. The hollow body includes two substantially vertical structural elements, and the first structural element is formed by the lower portion of the partition.

7 Claims, 4 Drawing Sheets

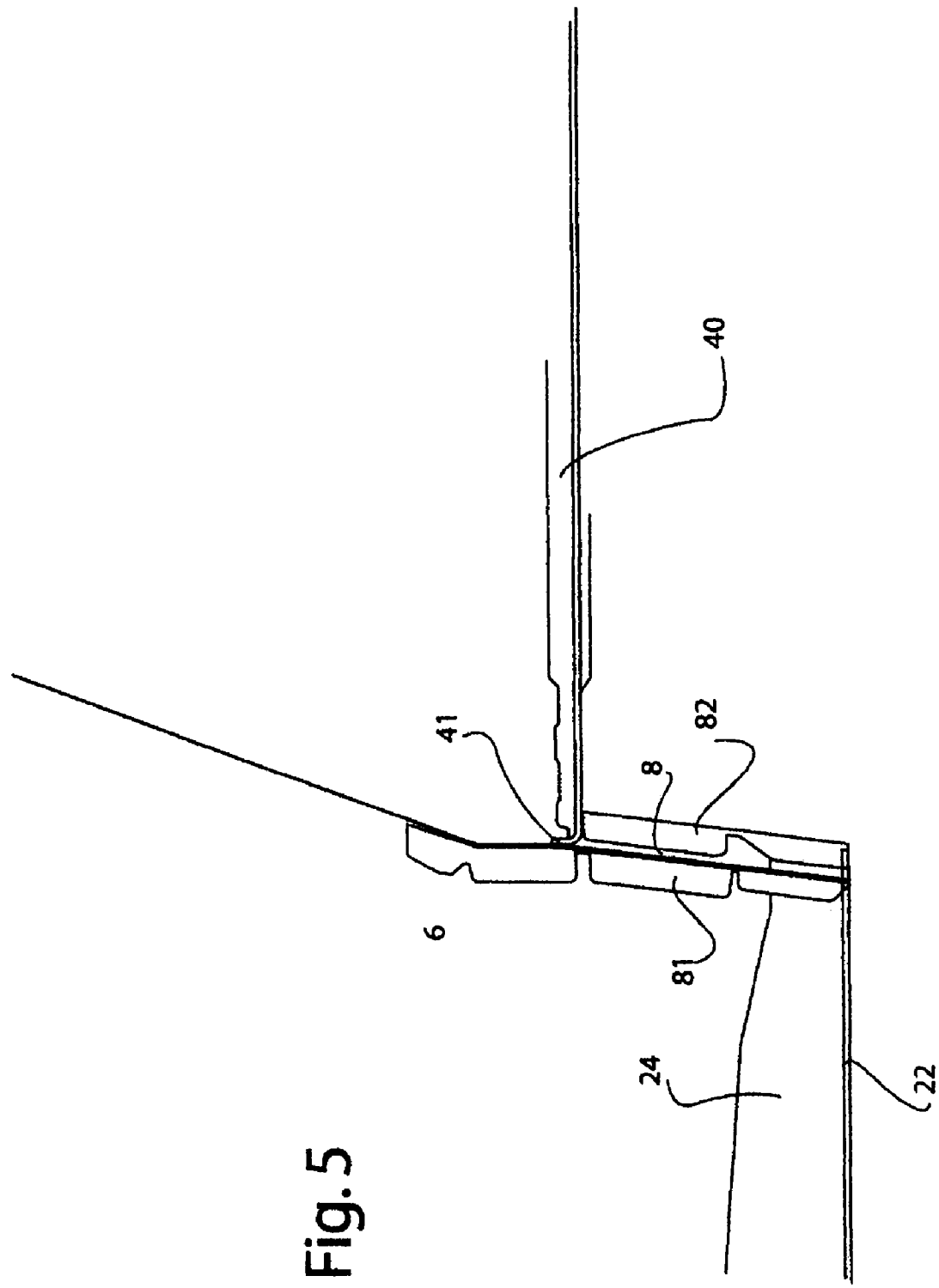

STRUCTURAL ARRANGEMENT OF A MOTOR VEHICLE

BACKGROUND

The present invention concerns a structural arrangement of a motor vehicle, notably an arrangement of the type comprising a cabin and a loading bed between which lies a substantially vertical partition, of the type comprising a cabin floor which extends at a first height and a loading floor of the bed which extends at a second height which differs from the first height of the cabin floor, and of the type comprising a hollow body which stiffens the structure and extends substantially vertically between the first height of the cabin floor and the second height of the loading floor.

The vehicles with a loading bed usually called pick-ups include primarily a body forming a driving station and a bed fastened to this body and forming a load space. They are specifically designed and developed because of the particular forces to which this type of vehicle is subjected, which differ from the forces to which a saloon vehicle is subjected. However, in some cases, pick-ups are developed on the basis of saloons and are the result of arrangements made to an initial design specific to a saloon. It is then a question of re-using as many parts of the existing saloon as possible and making technical solutions as to the additional elements on this basis, to address these specific constraints.

The document JP 2006 076467 proposes a structural arrangement of an automobile vehicle of the type described above with a hollow body stiffening the structure extending substantially vertically between the first height of the floor of the cabin and the second height of the loading floor. The hollow body comprises two substantially vertical structural elements.

BRIEF SUMMARY

The present invention proposes an arrangement as described above characterized in that the hollow body comprises two substantially vertical structural elements and the first structural element is formed by the lower portion of the partition.

Such an arrangement aims to provide surplus stiffness in torsion of the vehicle, to stiffen the assembly formed by the bed and by the body.

According to various features of the invention:
- the second structural element is formed by a reinforcing part facing the lower part of the partition toward the rear of the vehicle.
- the hollow body has the shape of a quadrilateral, consisting in its upper part of the front end of the loading floor and in its lower part of the rear end of the floor of the cabin, this hollow body being further composed on the one hand of a first structural element formed by the lower part of the partition, this lower part of the partition being in contact with the loading floor and the floor of the cabin, and on the other hand of a second structural element extending in the heightwise direction between the loading floor and the floor of the cabin.
- the lower part of the partition is fastened to the upper face of the floor of the cabin and the front end of the loading floor is fixed to the partition.

The invention also concerns an automobile vehicle of the type including a cabin and a loading bed, characterized in that it includes a structural arrangement of the above kind and a series of automobile vehicles comprising at least a first vehicle of pick-up type and a second vehicle of saloon type, characterized in that the cabin and the associated cabin floor are common to the first and second vehicles.

BRIEF DESCRIPTION OF THE DRAWINGS

Other advantages and features of the invention will become apparent on reading the following description, for an understanding of which see the appended figures, in which:

FIG. 5 is a view in section of FIG. 2.

DETAILED DESCRIPTION

Figure 1:
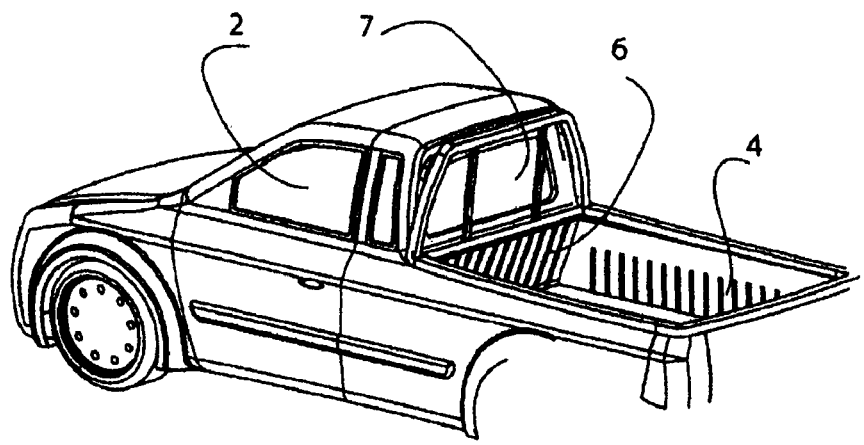
FIGS. 1 and 2 are views of a vehicle with a loading bed adapted to receive a structural arrangement of the invention.
Figure 2:
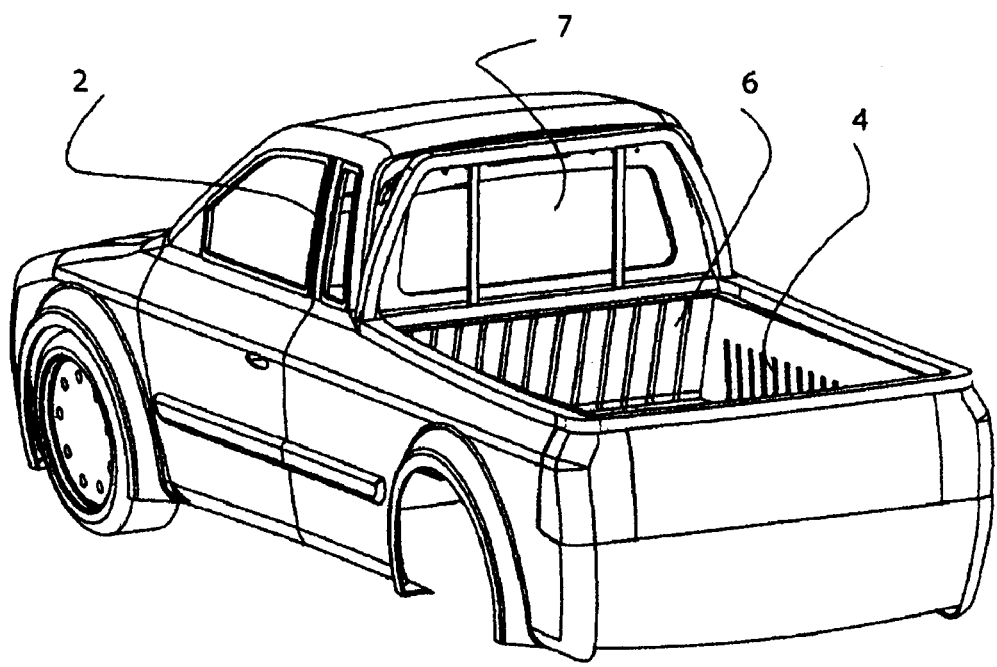

As represented in FIGS. 1 and 2, a vehicle with a loading bed includes primarily a cabin 2 and a loading bed 4, a partition 6 being disposed substantially vertically at the rear of the cabin 2 to form on the one hand the cabin closure and on the other hand the front end of the loading bed 4. A window 7 is mounted on this partition 6 so that the driver can see behind and interior arrangements may be fixed to the face of the partition oriented toward the interior of the cabin.

Figure 3:
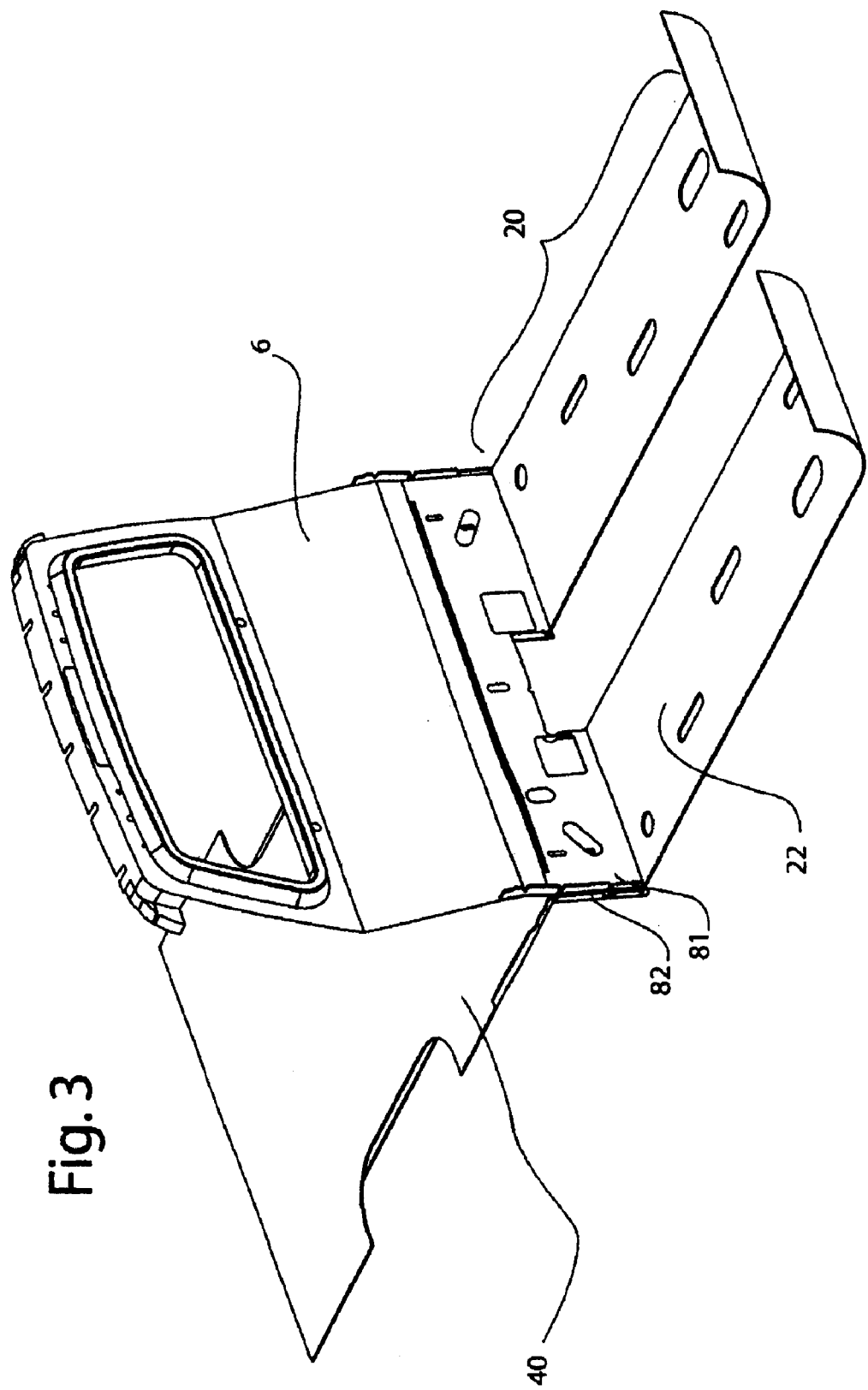
FIG. 3 is a diagrammatic representation of components of the structural arrangement of the invention, namely a partition, a hollow body, a loading floor and a cabin underbody.
Figure 4:
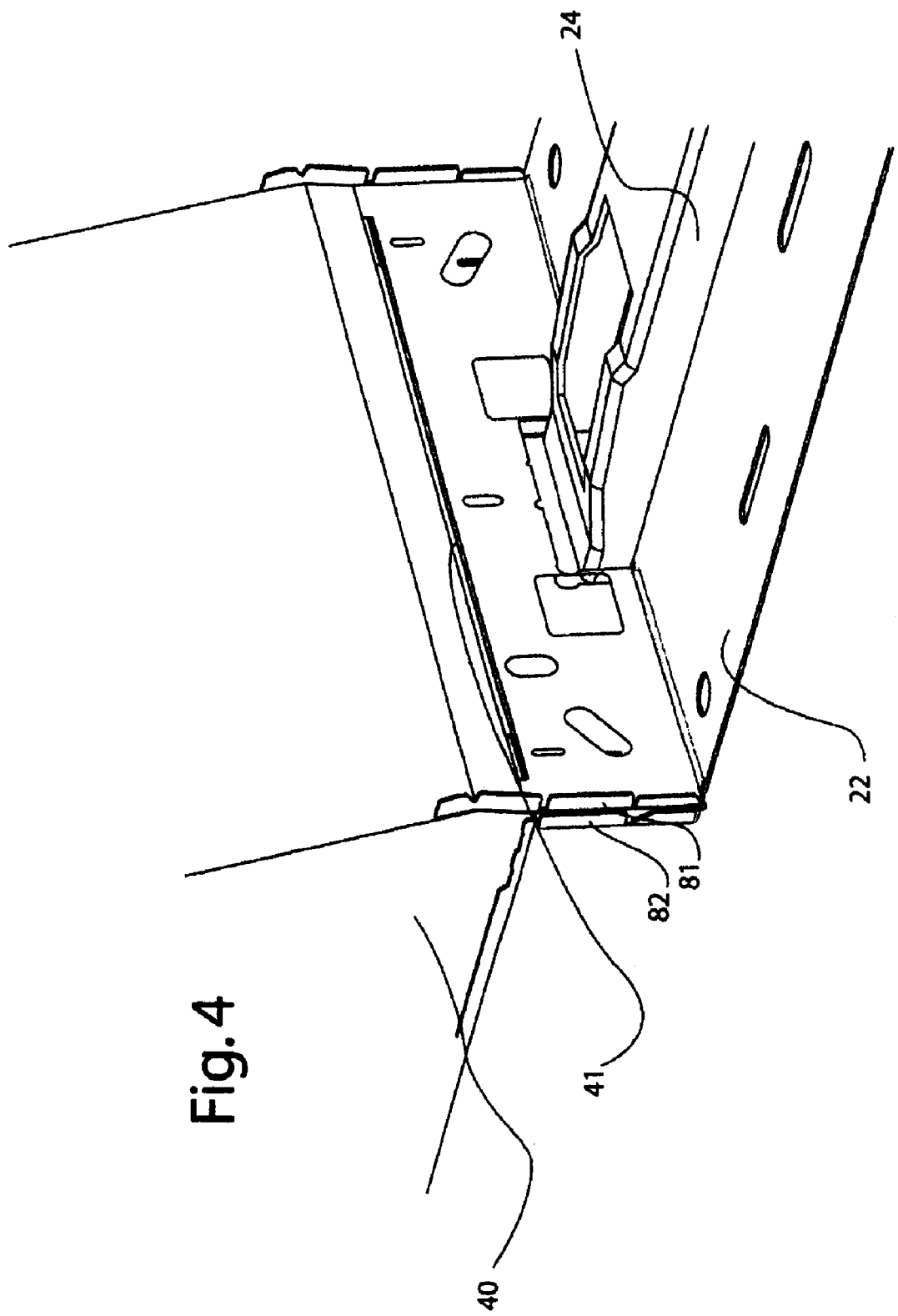
FIG. 4 is a diagrammatic representation of the elements from FIG. 1 and a tunnel fastened to the cabin underbody.

As represented in FIGS. 3 to 5, an underbody 20 extends under the cabin 2, formed primarily by a central floor 22 on which rests a tunnel 24 and on the other hand by a loading floor 40 extending to the rear of the vehicle and forming the part supporting the bed. The underbody 20 and the loading floor 40 are at different heights, the loading floor 40 being conventionally disposed higher than the underbody 20 of the cabin. To stiffen this assembly, substantially vertical structural means are disposed between the front end 41 of the loading floor 40 and the underbody 20 of the cabin.

According to the invention, a vertical hollow body 8 is thus disposed transversely to the vehicle between the loading floor 40 and the underbody 20 of the cabin over all of the height separating the respective planes of the loading floor 40 and the cabin underbody 20. This hollow body 8 is formed of two facing structural elements. The first structural element 81 is formed by the lower part of the partition 6, the lower edge of which is extended in accordance with the invention as far as the upper face of the central floor 22 forming the underbody of the cabin, this partition 6 also bearing against the front end 41 of the loading floor 40. The second structural element is disposed between the lower face of the loading floor 40 and the rear end of the floor 22 of the underbody 20 of the cabin, the side of this second structural element 82 disposed toward the rear of the vehicle facing the first structural element 81 formed by the lower end of the partition 6. In the conventional way, the joints between the components of the hollow body 8 and the floors are welded or spot-welded.

In the case of a vehicle underbody 20 including a central tunnel 24 as represented in FIGS. 5 and 6, the lower edge of the partition 6 and the hollow body reinforcement formed by the second structural element 82 have a central opening of complementary shape to the tunnel 24 in order to fit over the tunnel and thus further stiffen the area.

The hollow body 8 formed in this way makes it possible to obtain a torsion box disposed transversely to the vehicle at precisely the place where the bed 4 is mainly loaded in torsion. This arrangement makes it possible to confer great stiffness in torsion on the vehicle as a whole, the partition 6 forming the front part of the hollow body mainly the underbody of the cabin and all of the body forming the cabin, whereas the hollow body reinforcement mainly calls into play the loading floor. Moreover, the partition 6 incorporating the hollow body makes it possible to have continuity of inertia through a one-piece construction. This is an advantage of the invention in that the plane of torsion of the body on pick-up type vehicles passes through the partition.

Such an arrangement makes it possible to produce series of automobile vehicles comprising at least a first vehicle of pick-up type, i.e. as described above, and a second vehicle of saloon type, comprising a cabin and a closed structure at the rear of the vehicle, boot or tailgate, and to produce these series on the basis of a common cabin. Part of the design process is then no longer specific to either type of vehicle, which represents a significant improvement in terms of designing the entirety of a manufacturer's range.

The invention claimed is:

1. A structural arrangement of a motor vehicle, comprising:
   a cabin including a cabin floor that extends at a first height;
   a loading bed including a loading floor that extends at a second height which differs from the first height of the cabin floor;
   a substantially vertical partition, positioned between the cabin and the loading bed and extending from the cabin floor to above the loading floor, and including a first structural element formed by a lower portion of the partition such that the lower portion of the partition is thicker than an upper portion of the partition; and
   a second structural element positioned between a lower face of the loading floor and a rear end of the cabin floor, and the second structural element is separate and spaced apart from the partition,
   wherein the first structural element and the second structural element form a hollow body that stiffens the structure and extends substantially vertically between the first height of the cabin floor and the second height of the loading floor.

2. The structural arrangement as claimed in claim 1, wherein the second structural element is a reinforcing part that faces the lower portion of the partition toward a rear of the vehicle.

3. The structural arrangement as claimed in claim 1, wherein the hollow body has a shape of a quadrilateral, in an upper part of a front end of the loading floor and in a lower part of the rear end of the cabin floor, the hollow body comprising the first structural element formed by the lower part of the partition, the lower portion of the partition being in contact with the loading floor and the cabin floor, and the second structural element extending in a heightwise direction between the loading floor and the cabin floor.

4. The structural arrangement as claimed in claim 3, wherein the lower portion of the partition is fastened to an upper face of the cabin floor and the front end of the loading floor is fixed to the partition.

5. A series of automobile vehicles, comprising:
   a first vehicle including the structural arrangement as claimed in claim 1; and
   a second vehicle of saloon type, comprising a cabin and a closed structure at a rear of the second vehicle, wherein the cabin and the associated cabin floor are common to the first and second vehicles.

6. The structural arrangement as claimed in claim 1, wherein the second structural element and the lower portion of the partition each include a central opening of complementary shape to a transmission tunnel.

7. The structural arrangement as claimed in claim 1, wherein the partition does not contact the cabin floor at the rear end of the cabin floor.

* * * * *